Patented Mar. 4, 1924.

1,485,697

UNITED STATES PATENT OFFICE.

CHARLES E. NORTH, OF MONTCLAIR, NEW JERSEY, ASSIGNOR TO THE MILK OIL CORPORATION, A CORPORATION OF DELAWARE.

PROCESS OF EXTRACTING OIL FROM MILK AND CREAM.

No Drawing.   Application filed June 14, 1922.  Serial No. 568,360.

*To all whom it may concern:*

Be it known that I, CHARLES E. NORTH, a citizen of the United States of America, residing at Montclair, in the county of Essex and State of New Jersey, have invented certain new and useful Improvements in Processes of Extracting Oil from Milk and Cream, of which the following is a full, clear, and exact description.

The processes heretofore most successfully employed for the separation of milk or butter fat from milk and cream have involved certain definite steps, the first of which manifestly is the treatment of the whole milk for separating out the cream. The subsequent treatment of the cream has varied, in one process it is washed perhaps several times with a volume of water equal to that of the skim milk and other products which have been removed, then acidified and finally passed through an oil separator, the output of which is pure anhydrous milk or butter fat. In another process the cream instead of being washed is agitated or whipped and then melted and washed in dilution tanks with hot water until the oil rises to the surface and the latter then passed through an oil separator. These processes are the subject of patents and in the art are now generally known.

In these and in all processes of a like nature for the extraction of oil from milk and cream, there are certain obstacles which must be fully overcome before the process can be regarded as a practical and commercial success. (1) The solution of casein which is in the form of a colloid or gelatinous material, because of its viscous nature, acts as a binder of the globules of fat, holding them in suspension as an emulsion in the milk and preventing or retarding their separation from the milk fluid. (2) The fact that the fat globules themselves vary greatly in size interferes with their complete separation, a large proportion of them being so minute that even under high centrifugal force they are too light to be readily removed from the milk.

In carrying out the process of obtaining the oil or butter fat from milk or cream I have had more particularly in mind these difficulties and have carefully sought to avoid them with the result that by a modification of the process which I have set forth in my Patent No. 1,416,053 granted on the 16th day of May, 1922, I have reduced the cost of recovering the fat, have simplified the process and rendered it easier to carry out, thus scoring a substantial advance in the art which in processes carried out on a large scale is of great commercial value and importance.

According to my present invention I proceed as follows—I first separate out the cream from the whole milk by means of any suitable form of centrifugal separator, this being the simplest and most economical method of obtaining the cream. I next wash the remaining skim milk from the cream by diluting the latter with water, in an amount about sufficient to restore the mixture to its original volume and pass the mixture through an ordinary cream separator. I then agitate or whip the washed cream by means of any device or apparatus similar to those ordinarily used for whipping cream, for the purpose of causing the fat globules to coalesce. I then melt the fat in the cream by warming the cream to a temperature most suitable for passage through an oil separator, and finally I extract the pure oil by means of an ordinary oil separator.

The separation of the cream from the whole milk, in the initial step, results in the removal of a large part of the casein in the skim milk which is thrown out of the separator, and the concentration of the fat particles in the cream. If then, this cream is diluted with sufficient water and the diluted mixture again passed through a cream separator the remanent skim milk is very largely removed so that the product of the second step may very properly be regarded as a washed cream from which the skim milk has been removed in about the proportion of the dilution used. This removal of the skim milk means the elimination of the binder which holds the fat particles in suspension so that the extraction of the fat by the subsequent steps of the process is very greatly facilitated.

Again the smaller particles of the fat which, because of their extreme lightness, respond but indifferently to the centrifugal force in an oil separator are beaten together or coalesced by the whipping or agitation of the cream so that they unite in masses and the cream is transformed from a mixture of large and small fat particles to one composed of large masses of fat produced by the coalescence resulting from the whipping.

When cream has first been washed comparatively free of skim milk, which as has been stated, is the binder of the emulsion, and then whipped to coalesce the small into larger particles of fat, it may, when heated to a temperature sufficient to reduce the fat to liquid form, be passed rapidly through a centrifugal oil separator in large volume with an almost complete extraction of the oil from the other ingredients constituting the cream. For example, a cream containing 40% of fat will contain 60% of other ingredients, including dilution water, a small percentage of casein in colloid suspension, and a small percentage of sugar, salts, etc.

The process above described, for the reasons stated, constitutes a marked advance in this art and is one of great commercial value and importance.

What I claim is—

1. The process herein described of extracting oil from milk and cream which consists in separating the cream from the whole milk, washing the cream to remove the remanent skim milk, casein and other ingredients, agitating or whipping the washed cream to cause the fat particles to coalesce, heating the agitated cream to melt the fat particles and separating out the melted fat, as herein set forth.

2. The process herein described of extracting oil from milk or cream, which consists in separating out the cream from the whole milk, diluting the cream with water and subjecting the mixture to a second separating process, agitating or whipping the washed cream, heating the agitated cream to a temperature sufficient to melt the fat particles and subjecting the heated cream to the action of a centrifugal oil separator for extracting the pure oil.

3. In the process of recovering oil from cream, the steps for bringing the cream to a condition in which the emulsion may be most readily broken and the water separated from the oil which consists in washing the cream to remove practically all of the casein and other solids not fat and then whipping the washed cream.

In testimony whereof I hereto affix my signature.

CHARLES E. NORTH.